United States Patent [19]

Birkenstock et al.

[11] Patent Number: 5,253,993
[45] Date of Patent: Oct. 19, 1993

[54] APPARATUS FOR THE PRODUCTION OF PELLETS OF METAL POWDER USED AS CATALYSTS

[75] Inventors: Udo Birkenstock, Ratingen; Wolfgang Gay, Odenthal; Wolfgang Korsch, Berlin, all of Fed. Rep. of Germany

[73] Assignee: Bayer Aktiengesellschaft, Leverkusen, Fed. Rep. of Germany

[21] Appl. No.: 868,913

[22] Filed: Apr. 15, 1992

Related U.S. Application Data

[62] Division of Ser. No. 739,972, Aug. 5, 1992, Pat. No. 5,135,903.

[30] Foreign Application Priority Data

Aug. 21, 1990 [DE] Fed. Rep. of Germany ....... 4026351

[51] Int. Cl.⁵ .............................................. B22F 3/00
[52] U.S. Cl. ........................................ 425/78; 100/72; 134/104.2; 134/111; 134/198; 264/37; 264/39; 425/217; 425/225; 425/258; 425/352
[58] Field of Search ...................... 75/356; 100/72, 73, 100/74, 75, 131, 903; 134/104.1, 104.2, 104.3, 104.4, 111, 115 R, 198; 264/37, 39; 425/78, 139, 149, 150, 170, 215, 216, 217, 225, 226, 227, 228, 258, 344, 351, 352, 354, 355, 406, 422, 424, 432, 444

[56] References Cited

U.S. PATENT DOCUMENTS

| | | | |
|---|---|---|---|
| 3,052,919 | 9/1962 | Rayburn | 425/227 |
| 3,128,499 | 4/1964 | Smolenski | 425/225 |
| 3,599,578 | 8/1971 | Sato | 425/216 |
| 3,647,333 | 3/1972 | Smith | 425/78 |
| 3,687,588 | 8/1972 | Smith | 425/352 |
| 3,941,537 | 3/1976 | Abraham | 425/228 |
| 4,140,453 | 2/1979 | Joan, Jr. | 425/352 |
| 4,364,719 | 12/1982 | Levine | 425/78 |
| 4,452,578 | 6/1984 | Levine et al. | 425/78 |
| 4,565,082 | 1/1986 | Heath et al. | 425/78 |

FOREIGN PATENT DOCUMENTS

| | | |
|---|---|---|
| 50-99987 | 8/1975 | Japan. |
| 64-3077 | 1/1989 | Japan. |
| 1493384 | 7/1989 | U.S.S.R. |
| 1519841 | 11/1989 | U.S.S.R. |
| 1373351 | 11/1974 | United Kingdom. |
| 1381493 | 1/1975 | United Kingdom. |
| 1441172 | 6/1976 | United Kingdom. |

Primary Examiner—Scott Bushey
Attorney, Agent, or Firm—Sprung Horn Kramer & Woods

[57] ABSTRACT

An apparatus for the production of pellets of metal powder, more particularly pellets of highly active metal powder, for example Raney catalysts, has a press with a filling shoe and a pellet discharge shoot. A wet processing environment is established and thus no inert gas atmosphere is required to avoid oxidation of the metal powder.

5 Claims, 1 Drawing Sheet

APPARATUS FOR THE PRODUCTION OF PELLETS OF METAL POWDER USED AS CATALYSTS

This application is a divisional of application Ser. No. 07/739,972, filed Aug. 5, 1992, now U.S. Pat. No. 5,135,903.

BACKGROUND OF THE INVENTION

This invention relates to a process for the production of pellets of metal powder, more particularly highly active metal powder, which may be used for example as fixed-bed catalysts in chemical processes. Fixed-bed catalysts of the type in question are used in catalytic gas-phase and trickle-phase processes in which the reactants are passed through or over a catalyst bed. This is described, for example, in DE-A 3 403 973.

A fixed-bed catalyst normally has well-defined geometric shapes, for example rings or cylinders. The cylindrical shape is the most commonly encountered. Considerable importance is attributed both to the crushing strength of the individual shaped pellets of the catalyst bed, because inadequate compressive strength leads to disintegration of the pellets and hence to contamination of the reaction product, and to a correspondingly large inner surface of the individual pellets. The pellets are normally produced under a defined high pressure in a pelleting machine using catalyst powder as the starting material.

If fine-particle, more particularly powder-form, metals, for example those of group VIII of the periodic system, are used as catalyst materials, the pelleting process has to be carried out in an oxygen-free atmosphere to avoid surface oxidation which among other things is because of the large surface of the highly active powders. Such oxidation is highly exothermic and hence involves a considerable risk of fire and possibly explosions.

The metal powders are normally supplied for processing in the form of an aqueous suspension or slurry. Production of the metallic pellets then comprises the following steps:

drying the metal powder in an inert gas atmosphere, pelleting the powder in a pelleting machine, again in an inert gas atmosphere, and storing the pellets produced in water or another liquid.

SUMMARY OF THE INVENTION

The problem addressed by the present invention was to develop a simplified process for the production of such pellets in which there is no need for the inert gas atmosphere.

The solution to this problem is characterized by a process for the production of pellets of metal powder by press-molding in pelleting machines, wherein said metal powder to be processed is in the form of a suspension in a liquid and the pellets are produced by wet pressing of the suspension in a wet operating environment.

Essentially, the process according to the invention comprises directly processing suspensions or slurries containing metal powder to pellets or shaped particles. The pellets are directly produced from the suspension by wet-pressing thereof in pelleting machines, more particularly eccentric presses.

The process according to the invention may be carried out, for example, using metal powders containing one or more metals in finely divided form of the type used, for example, for catalytic purposes. Catalysts of this type are known, for example, by the names of Mohr catalysts and Raney catalysts, for example as platinum Mohr, palladium Mohr, Raney nickel and Raney iron.

Raney catalysts are produced by dissolving out the aluminium from an aluminium alloy of a catalytically active metal, for example nickel, using an alkali metal hydroxide and heat (see U.S. Pat. No. 1,563,587). This leaves a metal sludge which has a highly fissured and porous structure with a skeleton of metal crystals so that the catalysts are also known as skeletal catalysts.

The most common representative of this type is Raney nickel. In addition to the main component, nickel, Raney nickel essentially contains aluminium and hydrogen. Charging of the Raney catalysts with hydrogen in the course of their production makes them suitable for use as hydrogenation catalysts and is reponsible for their pyrophoric properties.

Optionally pyrophoric powders of, for example, thallium, vanadium, chromium, manganese, iron, cobalt, titanium, nickel, copper, zirconium, niobium, molybdenum, ruthenium, rhodium, palladium, silver, hafnium, tantalum, tungsten, rhenium, osmium, iridium, platinum, gold and lead may be used in the process according to the invention. Raney catalysts, more particularly nickel-, cobalt- and/or iron-containing Raney catalysts, are preferably used in the process according to the invention.

With pyrophoric metal powders, it is important to ensure that they are not exposed to atmospheric oxygen, i.e. they must not dry out and should always be covered with a layer of liquid, generally water, in storage.

Since suspensions of metal powders are used in the process according to the invention, mixtures of pyrophoric metal powders and liquids which keep oxygen away, for example, may be directly used for this purpose.

The liquid phase of the suspension to be used is above all water, although other organic liquids, for example alcohols or ketones, or organic fats may also be considered. The metal powder to be pelleted may be, in particular, a powder which cannot be processed in the form of a dry powder, for example because of the danger of self-ignition. This applies, for example, to metals of group VIII of the periodic system, preferably nickel, cobalt and iron, particularly nickel.

The metal powders for the process according to the invention may have particle diameters of, for example $\leq 200$ μm, preferably $\leq 150$ μm and, more preferably, $\leq 100$ μm. According to the invention, amorphous metallic pellets combining defined hardness with a defined inner surface may be directly produced from suspensions of metal powders such as these. Since the material to be processed is situated in a wet environment throughout all the production phases, the oxidation reaction does not take place and an inert gas atmosphere is superfluous.

Accordingly, the considerable simplification of the production process, i.e. elimination of the need for energy-intensive drying and the inert gas atmosphere, has proved to be a particular advantage.

Other advantageous embodiments of the process according to the invention and the apparatus according to the invention include water used as the liquid, Raney catalysts in aqueous suspension used as said powder, and the apparatus for the production of pellets of metal powder suspensions comprising a press with a filling shoe and a pellet discharge chute, and means for establishing a wet processing environment.

BRIEF DESCRIPTION OF THE DRAWING

A preferred apparatus or carrying out the process according to the invention is described in the following with reference to FIG. 1 which shows an eccentric press for the production of Raney catalysts in pellet form from an aqueous metal suspension.

DETAILED DESCRIPTION OF THE INVENTION

Figure 1:
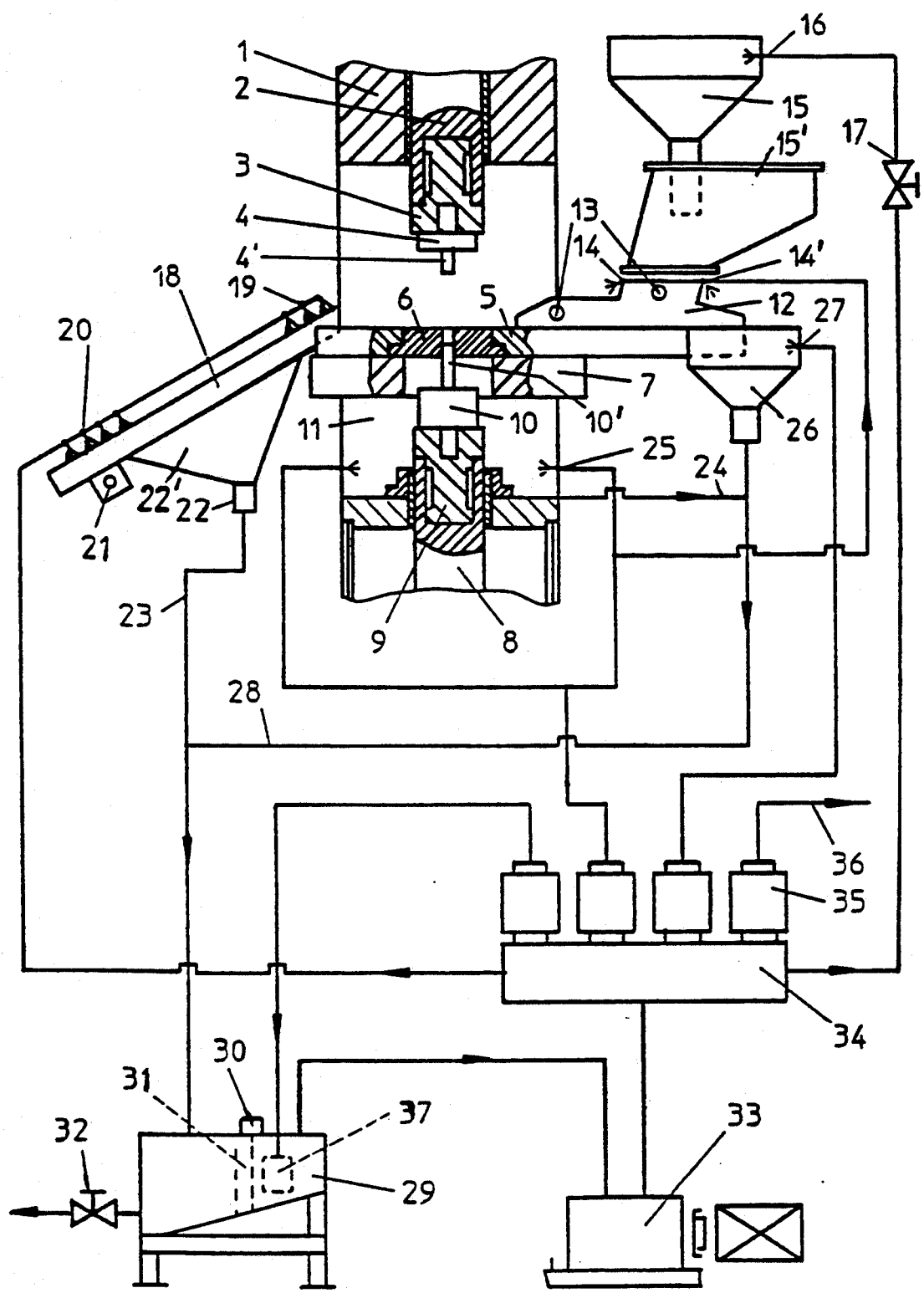

The eccentric press 1 shown in FIG. 1 comprises an upper plunger 2 for accommodating a mounting 3 for an upper holder 4 for an upper compression punch 4' and a cavity plate 5 with a cavity 6 and, underneath, a vibrating table 7 and also a lower plunger 8 for accommodating a mounting 9 for a lower holder 10 for the lower compression punch 10' which is guided in the cavity 6. The compression punches 4' and 10' may be multiple punches, for example a 30–60 punch for the production of pellets, for example having diameters of 2 to 10 mm and a height of 2 to 10 mm and with or without a facet or curvature. Strain gauges (not shown) are arranged on the mountings 3 and 9 for the upper holder 4 and the lower holder 10. They are connected to a control and regulating system (not shown) for the eccentric press 1. The region below the vibrating table 7 forms an intermediate chamber 11 which is hermetically sealed.

For supplying the aqueous metal suspension for the production of pelleted Raney catalysts, a filling shoe 12 is mounted for reciprocation above the cavity plate 5, being equipped with two stirring rollers 13 and the spray nozzles 14 and 14'. Situated above the filler shoe 12—with a material container 15' in between—is a feed hopper 15 comprising an optionally variable-position, spray nozzle 16. A feed pipe which can be opened or closed by the handoperated valve 17 leads to the spray nozzle 16.

The cavity, plate 5 is adjoined on its side opposite the filling shoe 12 by a discharge chute 18 for the pelleted Raney catalysts which comprises flat-jet spray nozzles 19 for preliminary cleaning and full-cone spray nozzles 20 for post-cleaning of the pellets and on which a vibrator 21 is arranged as a discharge aid. Situated beneath the discharge chute 18 is a collecting funnel 22' with a collecting vessel 22 for the sludge washed off from the pellets, which is removed through a return pipe 23. Another return pipe 24 starts out from the intermediate chamber 11 which is also provided with spray nozzles 25 for cleaning.

Associated with the eccentric press 1 is a spray and rinsing water circuit comprising a water pump 33 which feeds spray water via a distributor block 34 and valves 35 through corresponding feed pipes and the handoperated valve 17 to the individual spray nozzles 14,14',16,19,20,25 and 27. One of the valves is adjoined by a disposal pipe 36. Arranged on the rearward side of the filling shoe 12 at the end of the cavity plate 5 is a sludge container 26 with spray nozzles 27. The sludge collected in the sludge container 26 is removed through a return pipe 28. The sludge return pipes 23, 24 and 28 are connected to a water/sludge container 29 which is provided with a float switch 30, a partition 31, an intake filter 37 and a drainage cock 32.

The starting product (the metal powder suspension) is fed to the eccentric press 1 for pelleting by means of the filling shoe 12 which is filled from the filling container 15 and 15'. The filling volume to be adjusted is monitored via the top punch compression indicator as is the liquid content of the suspension. Any sludge deposits in the filling container 15 are removed by the spray nozzles 16 which prevents drying out and, hence, any exothermic oxidation of metal sludge residues. The filling shoe 12 is mounted for movement on the cavity plate 5 and, during its forward movement, fills the bores of the cavity 6 of which only one has been shown in FIG. 1 in the interests of simplicity. The function of the two stirring rollers 13 is to intensify filling. At the same time, the front edge of the filling shoe 12 transports finished pellets to the discharge chute 18. Special sealing strips in the wearing surface of the filling shoe prevent wear of the cavity plate 5 and excessive egress of liquid and metal sludge. The spray nozzles 14 and 14' are arranged in the forward and rearward direction on the filling shoe 12. In the forward direction, the finished pellets are moistened and are transported with the excess metal sludge towards the pellet discharge chute 18; in the rearward direction, the filling in the cavity 6 is made uniform by the moistening effect of the nozzles 14 so that punch breakage and high punch wear are also prevented. The rear nozzle 14' washes the sludge deposited off the cavity plate 5 into the collecting vessel 26. On account of the wet operating environment, the machine is made water-tight in this region and the cavity plate 5 is equipped with collecting and draining channels to allow controlled recycling of the sludge by means of the nozzles 27.

Fixed in the upper holder 4 and the lower holder 10 are as many individual punches as there are bores in the cavity plate. After the filling shoe 12 has returned to its starting position, the individual punches enter the filled cavity 6 from above and below and press out the pellets from the sludge. It is important in this regard to maintain certain intervals between the wall of the individual cavity bores and the associated top and bottom punches. The object of this is to ensure that water is pressed out from the cavity without any significant losses of metal powder during the pelleting process. Excessive intervals or tolerances between cavity bores and the associated punch would result in emptying of the cavity during pelleting; inadequate tolerances would mean that the water could not be displaced from the pellet so that no pellets would be formed. On account of the imcompressibility of water, punch breakages could also occur. The tolerances and hardnesses of the tools must be adapted to the suspension to be pelleted. With aqueous nickel powder suspensions having nickel particle diameters of $\leq 100$ $\mu$m, it has been found for example that cylindrical cavity bores having a predetermined width, for example of 0.02 mm, are of advantage in the case of 5 mm diameter compression molds. The top punch/cavity tolerances are preferably at max. 0.09 mm and more preferably at 0.05 to 0.07 mm while the bottom punch/cavity tolerances are preferably at 0.07 mm and more preferably at 0.04 to 0.06 mm.

The press is always stopped preferably in the uppermost position of the bottom punch so that the cavity 6 is emptied. The position of the holding point is important because the finished pellets should not remain in the cavity 6 for more than about 30 seconds in their non-moistened state. A longer holding time in the non-moistened state can result in drying oat of the pellets and destruction of the hardened cavity 6, the bottom punch 10' and/or the top punch 4'.

During the pelleting process, metal sludge is deposited on the lower holder 10, the mounting 9 and the lower plunger 8 in the intermediate chamber 11. This can endanger the guiding of the lower plunger. Accordingly, the sludge is flushed out from the hermetically sealed lower chamber 11 by adjustable spray nozzles 25 and delivered through a return pipe 24 to the water/sludge container 29.

After pelleting, the pellets are ejected and are transported to the pellet discharge chute 18 by the forward movement of the filling shoe 12. At the same time, the cavity 6 is refilled.

The use of the pellets as catalysts in chemical processes requires absolute cleanness, i.e. freedom from any adhering powder-form material. Preliminary cleaning is effected by three flat-jet nozzles 19 situated at the beginning of the pellet discharge chute 18. The pellets are delivered via guide plates to the collecting zone where they are finally cleaned by four full-cone nozzles 20. By means of the vibrator 21 and the discharge chute, the pellets are repeatedly turned as they move down the chute 18 so that an optimal cleaning effect is obtained. For example, it would also be possible to use a vibrating sieve chute or the like with a rinsing facility. The pellets thus cleaned are then stored in a water bath.

The integrated spray and rinsing water circuit performs several functions.. It provides the wet operating environment required to prevent self-ignition of the metal sludge by drying; it removes metal sludge from the machine parts and transports it through return pipes 30 into the collecting vessel 29 so that it can be reintroduced into the production process; it cleans the finished pellets and considerably reduces water consumption because the rinsing water cleaned by the intake filter 37 can be reused.

The various spray nozzles on the filling container 15, the filling shoe 12, the collecting vessel 26, the intermediate chamber 11 and the pellet discharge chute 18 are all supplied by the water pump 33 via the valve distributor block 34 and the valves 35. The supply of water to the nozzle 16 on the filling container 15 can be switched on and off by the hand-operated valve 17. The water pump 33 pumps water/sludge out from the water container 29. The metal sludge rinsed off and the rinsing water are collected in the collecting vessel 26 on the cavity plate 5 and the container 22 on the discharge chute 18 and are transported via the return pipes 23 and 28 together with the residues from the intermediate chamber 11 via the return pipe 24 to the water/sludge container 29.

The sloping-bottom water/sludge container 29 has a capacity of, for example, 100 to 200 l and is divided by a removable partition 31. One half is used for the deposition of sludge; a water-cleaning filter 37 and a float switch 30 are arranged in the other half. The float switch 30 in conjunction with an optical indication monitors the min./max. level in the container. At min., the press is stopped; at max., water is pumped off again through a disposal pipe 36 until the level is back to normal.

The metal sludge can be drained off through a hand-operated valve 32 and returned to the production process.

The apparatus according to the invention for the production of pellets of metal powders is characterized in that the metal powder is present in the form of a suspension in a liquid and the pellets are produced by wet pressing of the suspension in a wet operating environment, an eccentric press 1 being provided with a filling shoe 12, a pellet discharge chute 18 and a control system and the intervals between the wall of an inner bore of the cavity 6 and the surfaces of the corresponding top and bottom punches being adapted to the metal powder suspension.

Particular embodiments of the apparatus according to the invention comprise the intervals between the wall of the inner bore of the cavity and the surfaces of the corresponding top and bottom punches of the press having a size adapted to the metal powder suspension, an integrated spray and rinsing water circuit consisting of a water pump, a water-sludge container, a spray nozzle control, several spray nozzles and sludge nd rinsing water return pipes present for establishing the wet processing environment, the water/sludge container comprising a separator for separating rinsing water and sludge, the entire processing area of the pelleting machine protected from the liquid phase of the metal powder suspension by guide elements and seals, spray nozzles for permanently cleaning the filling shoe, cavity plate, intermediate chamber and pellet discharge chute areas and wherein the pellet discharge chute comprises a preliminary cleaning stage, a collecting zone and a final cleaning stage with a vibrator.

The process according to the invention and the apparatus according to the invention have a number of advantages. Metal powders, particularly Raney catalysts, can readily be brought into a form which enables them to be used in catalytic trickle-phase and gas-phase processes. The quantity of metal powder pellets which can be produced per unit of time is very high. The pellets thus obtained do not have to be cleaned in a separate step to remove adhering powder. Far less fresh water is required than in conventional wet pressing operations. The pellets are obtained in a reproducible, uniform and controllable quality. Hardly any of the metal powder to be pelleted enters the wastewater and, hence, the environment. In contrast to known processes where at most about 50% of the metal powder used can be obtained in pellet form, virtually 100% of the metal powder used can be brought into pellet form in accordance with the invention with very little variation in the pellet characteristics (for example their strength, inner surface, porosity and bore volume) from one pellet to the next and from one batch to the next, which is also in contrast to known processes.

The present invention also relates to the use of pellets of metal powder produced in accordance with the invention as catalysts in trickle-phase and gas-phase processes. Examples of the use of such catalysts are hydrogenation processes, emission control systems, dehydrogenation processes, isomerization processes, Fischer-Tropsch synthesis, the production of alcohols from carbon monoxide and hydrogen and the production of amines.

Examples of hydrogenation processes include the hydrogenation of nitro compounds to the corresponding amines, nitriles to the corresponding amines, sugars to the corresponding sugar alcohols, higher aldehydes and ketones to the corresponding alcohols, optionally substituted nitronaphthalene sulfonic acids to the corresponding aminonaphthalene sulfonic acids, phenyl rings to cyclohexane rings (for example aniline to cyclohexylamine), olefinic or acetylenic multiple bonds to saturated or less unsaturated bonds and the hydrogenation of esters to alcohols. Examples of emission control applications include the purification of waste gases containing ethylene oxide with formation of ethanol and the purification of formaldehyde-containing waste gases with formation of methanol. One example of the production of amines is their production from alcohols and ammonia. One example of an isomerization process is the conversion of isobutene into but-1-ene. Examples of dehydrogenation processes include the dehydrogenation of amines to nitriles, alcohols to aldehydes or ketones, cyclohexane rings to phenyl rings and saturated single bonds to unsaturated multiple bonds.

In the following Examples, percentages are by weight, unless otherwise stated.

EXAMPLES

Example 1

An eccentric press of the type described in detail in the foregoing with reference to FIG. 1 was used. A suspension of Raney nickel in water was used (the Raney nickel having been obtained from an alloy containing 50% by weight aluminium and 50% by weight nickel). The Raney nickel had a particle size of $\leq 80$ μm. The compression mold was a 50x compression mold for the production of pellets having a height of 50 mm, a diameter of 5 mm and a flat facet which was operated under a pressure of max. 500 kN.

The pellets produced had the following parameters:

| | |
|---|---|
| True density (He): | 6.942 g/cm$^3$ |
| Apparent density (Hg): | 3.636 g/cm$^3$ |
| Total pore volume (2 Å–13 μm): | 131.0 mm$^3$/g |
| Hg pore volume (37.5 Å–13 μm): | 131.0 mm$^3$/g |
| Fine pore volume (2 Å–37.5 Å): | 0.0 mm$^3$/g |
| Spec. total surface N$_2$ (BET): | 48.90 m$^2$/g |
| Spec. total Hg pore surface: | 5.53 m$^2$/g |
| Porosity for pore diam. below 13 μm: | 47.63% |
| Average pore diameter: | 107.1 Å |
| Bulk density: | 2.47 kg/l |
| Fracture hardness, surface: | 215 N/pellet |

Example 2

The procedure was as described in Example 1, except that the compression mold was operated under a molding pressure of max. 400 kN.

The pellets thus produced had the following parameters:

| | |
|---|---|
| True density (He): | 6.974 g/cm$^3$ |
| Apparent density (Hg): | 4.081 g/cm$^3$ |
| Total pore volume (2 Å–13 μm): | 101.7 mm$^3$/g |
| Hg pore volume (37.5 Å–13 μm): | 87.2 mm$^3$/g |
| Fine pore volume (2 Å–37.5 Å): | 14.5 mm$^3$/g |
| Spec. total surface N$_2$ (BET): | 28.00 m$^2$/g |
| Spec. total Hg pore surface: | 14.56 m$^2$/g |
| Porosity for pore diam. below 13 μm: | 41.48% |
| Average pore diameter: | 145.2 Å |
| Bulk density: | 2.41 kg/l |
| Fracture hardness, surface: | 132 N/pellet |

Example 3

A vertically arranged, heat-insulated high-pressure tube of stainless steel with an internal diameter of 45 mm and a length of 1 m was filled with 1.4 l of a Raney nickel catalyst produced by pelleting as described in Example 1. 140 ml/h of a 50% solution of α-D-glycopyranosido-1,6-fructose in deionized oxygen-free drinking water adjusted to a pH value of 6.0 was pumped continuously upwards through this tube together with three times the molar quantity of high-purity oxygen under a pressure of 300 bar.

The aqueous solution and the hydrogen were passed through a heat exchanger and heated so that they entered the high-pressure tube with a temperature of 80° C. The mixture of aqueous solution and excess hydrogen leaving the high-pressure tube was passed through a condenser into a separator from which the hydrogen—after replacement of the quantity used—was pumped into the preheater, again together with non-hydrogenated solution, and from there back into the high-pressure tube.

The clear aqueous solution was expanded, filtered through a fine filter, concentrated in a falling-film evaporator to a sugar alcohol content of 80% and then completely crystallized in a vacuum crystallizer. The fine crystal powder obtained consisted of a mixture of α-D-glucopyranosido-1,6-mannitol and α-D-glycopyranosido-1,6-sorbitol in a ratio of 1:1 part; the water content was 5%. The mixture of the two stereoisomeric sugar alcohols was otherwise highly pure (purity > 99.6%). The content of non-hydrogenated α-D-glucopyranosido-1,6-fructose was below 0.1%, as was the sorbitol content. No mannitol could be detected. The catalyst was still as active after an operating time of 12,000 h. This corresponded to a catalyst consumption of less than 0.15%/kg hydrogenated substance.

Example 4

In the same way as described in Example 3, an aqueous solution of α-D-glucopyranosido-1,6-fructose having a pH value of 5.5 was hydrogenated in a high-pressure tube of the type described in Example 3 at a temperature of 115° C. and under a hydrogen pressure of 300 bar. The catalyst had been obtained by pelleting of a Raney nickel-iron catalyst in the form of an aqueous metal suspension in the manner described in Example 1. The Raney catalyst contained 15% iron. The pellets had the geometric dimensions mentioned in Example 1, a compressive strength of 138 N/pellet and an inner surface of 63 m$^2$/g.

The mixture of α-D-glucopyranosido-1,6-mannitol and -sorbitol obtained in the vacuum crystallizer has a purity of 99.3%. The content of unreacted α-D-glycopyranosido-1,6-fructose was 0.1%. The sorbitol content was 0.1%. The mannitol content was 0.01%. The catalyst was still as active after an operating time of 8,000 h.

Example 5

In the same way as described in Example 3, an aqueous solution of α-D-glycopyranosido-1,6-fructose having a pH value of 6.0 was hydrogenated in a high-pressure tube of the type described in Example 3 at a temperature of 105° C. and under a hydrogen pressure of 200 bar. The catalyst had been obtained by pelleting of a Raney nickel-cobalt catalyst in the form of an aqueous metal suspension in the manner described in Example 2. The Raney catalyst contained 10% cobalt. The pellets had the geometric dimensions mentioned in Example 1, a compressive strength of 137 N/pellet and an inner surface of 29 m$^2$/g.

The mixture of α-D-glycopyranosido-1,6-mannitol and -sorbitol obtained in a vacuum rotary tube had a purity of 99.2%. The content of unreacted α-D-glycopyranosido-1,6-fructose was 0.3%. The sorbitol content was 0.15%. No mannitol could be detected.

The catalyst was still as active after an operating time of 1,000 h.

Example 6 (Comparison Example)

In the same way as described in Example 3, an aqueous solution of α-D-glycopyranosido-1,6-fructose having a pH value of 6.0 was hydrogenated in a high-pressure tube of the type described in Example 3 at a temperature of 100° C. and under a hydrogen pressure of 300 bar. The catalyst had been obtained by application of an aqueous nickel salt solution to an inert spherical aluminium oxide support (diameter 5 mm) and subsequent conversion of the nickel into the metallic state by reduction in a stream of hydrogen. The nickel content of the catalyst was 18%. The inner surface of the catalyst was 65 m$^2$/g and thus substantially corresponded to the surface of the catalysts used in Examples 3 to 5. The mixture of α-D-glycopyranosido-1,6-mannitol and -sorbitol obtained in a vacuum crystallizer had a purity of 91.9%. The content of unreacted α-D-glycopyranosido-1,6-fructose was 1.7%. The sorbitol and mannitol content was 0.3%. In addition, unknown impurities amounting to 6.1% were found. Accordingly, the reaction product thus obtained could not be used as a sugar substitute.

In addition, a reduction in the activity of the catalyst was observed after an operating time of only 600 h. Although the percentage content of unreacted α-D-glycopyranosido-1,6-fructose could be reduced to 0.5% by increasing the reaction temperature from 100° to 120° C., the percentage content of unknown impurities did rise to 6.4% at the same time.

We claim:

1. An apparatus for production of pellets of metal powder suspensions which comprises a press with a filling shoe and a pellet discharge chute, and means for establishing a wet processing environment, wherein the means for establishing a wet processing environment comprises an integrated spray and rinsing water circuit consisting of a water pump, a water-sludge container supplying water to the pump, a spray nozzle control receiving water from the pump, several spray nozzles receiving water from the control and sludge and rinsing water return pipes for returning sludge and water to the water-sludge container.

2. An apparatus as claimed in claim 1, wherein the press has a cavity and top and bottom punches and intervals between a wall of an inner bore of the cavity and surfaces of the top and bottom punches to permit liquid to be passed out of the cavity with no significant loss of metal powder.

3. An apparatus as claimed in claim 1, having a processing area and further comprising guide elements and seals protecting the processing area from a liquid phase of the metal powder suspension.

4. An apparatus for production of pellets of metal powder suspensions which comprises a press with a filling shoe and a pellet discharge chute, and means for establishing a wet processing environment, wherein the press further comprises a cavity plate forming a cavity and an intermediate chamber there below and spray nozzles for cleaning the filling shoe, cavity plate, intermediate chamber and pellet discharge chute.

5. An apparatus for production of pellets of metal powder suspensions which comprises a press with a filling shoe and a pellet discharge chute, and means for establishing a wet processing environment, wherein the pellet discharge chute comprises a preliminary cleaning stage, a collecting zone and a final cleaning stage with a vibrator.

* * * * *